US008409044B2

(12) United States Patent
Hilker et al.

(10) Patent No.: US 8,409,044 B2
(45) Date of Patent: Apr. 2, 2013

(54) DIFFERENTIAL LUBRICATION FEED SYSTEM IN A DRIVE AXLE ASSEMBLY

(75) Inventors: Gregory J Hilker, Canton, MI (US); Kevin R Beutler, Columbiaville, MI (US); Robert B Dwyer, Lincoln Park, MI (US); Chih-Hung Chung, Troy, MI (US); David R Brandt, Shelby Township, MI (US); William G Hunt, Luna Pier, MI (US); Gregory E Woodside, Troy, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 1196 days.

(21) Appl. No.: 12/256,875

(22) Filed: Oct. 23, 2008

(65) Prior Publication Data
US 2010/0105513 A1  Apr. 29, 2010

(51) Int. Cl.
F16H 57/04 (2010.01)
(52) U.S. Cl. ......................................................... 475/160
(58) Field of Classification Search ........................ None
See application file for complete search history.

(56) References Cited

U.S. PATENT DOCUMENTS

| 1,903,146 | A |   | 3/1933  | Sterling |
| 2,015,108 | A |   | 9/1935  | Harper |
| 2,018,188 | A |   | 10/1935 | Padgett et al. |
| 2,037,173 | A |   | 4/1936  | Matthews |
| 2,061,009 | A | * | 11/1936 | Rothrock ...................... 475/246 |
| 2,142,575 | A | * | 1/1939  | Spicacci ........................ 475/247 |
| 2,147,145 | A |   | 2/1939  | Carlson et al. |
| 2,147,146 | A |   | 2/1939  | Carlson et al. |
| 2,368,963 | A |   | 2/1945  | Boden |
| 2,929,468 | A |   | 3/1960  | Steiner |
| 3,138,222 | A |   | 6/1964  | Dames |
| 3,318,173 | A |   | 5/1967  | Puidokas |
| 3,529,698 | A |   | 9/1970  | Nelson |
| 3,741,343 | A |   | 6/1973  | Lindenfeld et al. |
| 3,762,503 | A |   | 10/1973 | Wilder et al. |
| 3,838,751 | A |   | 10/1974 | Brown |

(Continued)

FOREIGN PATENT DOCUMENTS

| GB | 1115446     | 5/1968 |
| JP | 63-103056 A | 7/1988 |

(Continued)

OTHER PUBLICATIONS

International Search Report and Written Opinion of the International Searching Authority for International Application No. PCT/US2009/059766, dated Dec. 9, 2010.

*Primary Examiner* — David D Le
*Assistant Examiner* — Erin D Bishop
(74) *Attorney, Agent, or Firm* — Harness, Dickey & Pierce, P.L.C.

(57) ABSTRACT

A method for lubricating an axle assembly can include: coupling a pair of tapered roller bearing to opposite ends of a differential housing; placing the differential housing into a carrier housing assembly such that the tapered roller bearings support the differential housing on the carrier housing assembly for rotation about a first axis; collecting a lubricant proximate a side of one of the tapered roller bearings opposite the differential housing; and rotating the differential housing about the first axis to cause the one of the tapered roller bearings to move a portion of the collected lubricant through the differential housing. A related axle assembly is also provided.

12 Claims, 8 Drawing Sheets

U.S. PATENT DOCUMENTS

| | | | |
|---|---|---|---|
| 3,887,037 | A | 6/1975 | Haluda et al. |
| 4,018,097 | A | 4/1977 | Ross |
| 4,175,643 | A | 11/1979 | Jenkins |
| 4,199,202 | A | 4/1980 | Maeda |
| 4,227,427 | A | 10/1980 | Dick |
| 4,612,818 | A | 9/1986 | Hori et al. |
| 5,232,291 | A | 8/1993 | Kuan |
| 5,273,136 | A | 12/1993 | Martin et al. |
| 5,292,199 | A | 3/1994 | Hosbach et al. |
| 5,316,106 | A | 5/1994 | Baedke et al. |
| 5,540,300 | A | 7/1996 | Downs et al. |
| 5,634,530 | A | 6/1997 | Maekawa et al. |
| 5,709,135 | A | 1/1998 | Baxter |
| 5,749,801 | A | 5/1998 | Teraoka et al. |
| 5,813,493 | A | 9/1998 | Sloan et al. |
| 5,839,327 | A | 11/1998 | Gage |
| 6,045,479 | A | 4/2000 | Victoria et al. |
| 6,061,907 | A | 5/2000 | Victoria et al. |
| 6,132,329 | A | 10/2000 | Tison |
| 6,135,241 | A | 10/2000 | Ganguly et al. |
| 6,186,277 | B1 | 2/2001 | Tervo |
| 6,189,411 | B1 | 2/2001 | Francis |
| 6,199,663 | B1 | 3/2001 | Roy et al. |
| 6,267,203 | B1 | 7/2001 | Brissette et al. |
| 6,379,277 | B1 | 4/2002 | Victoria et al. |
| 6,481,979 | B2 | 11/2002 | Huang et al. |
| 6,488,479 | B1 | 12/2002 | Berger |
| 6,502,665 | B1 | 1/2003 | Brehob |
| 6,523,435 | B2 | 2/2003 | Ruehle et al. |
| 6,582,151 | B2 | 6/2003 | Hopson |
| 6,616,432 | B2 | 9/2003 | Szczepanski et al. |
| 6,702,703 | B2 | 3/2004 | Gervais, III et al. |
| 6,743,136 | B1 | 6/2004 | Jensen |
| 6,851,863 | B2 | 2/2005 | Yokota et al. |
| 6,855,083 | B1 | 2/2005 | Wagle et al. |
| 6,997,284 | B1 | 2/2006 | Nahrwold |
| 6,997,841 | B2 | 2/2006 | Wagle et al. |
| 7,008,345 | B2 | 3/2006 | Phelan et al. |
| 7,140,995 | B2 | 11/2006 | Mierisch et al. |
| 7,160,219 | B2 | 1/2007 | Oates |

FOREIGN PATENT DOCUMENTS

| | | |
|---|---|---|
| JP | 2006-283791 A | 10/2006 |

* cited by examiner

US 8,409,044 B2

DIFFERENTIAL LUBRICATION FEED SYSTEM IN A DRIVE AXLE ASSEMBLY

INTRODUCTION

The present disclosure generally relates to axle assemblies. More particularly, the present disclosure relates to a method for lubricating a differential in an axle assembly and a related axle assembly.

U.S. Pat. No. 1,631,217 appears to disclose an oiling system for bearings in a reduction drive. The oiling system employs tapered roller bearings to pump oil onto the gear teeth of an input pinion; the oil on the gear teeth is subsequently slung from the gear teeth of the input pinion where it collects in a chamber that drains toward the tapered roller bearings that support the spur gear (d) of the reduction drive.

U.S. Pat. No. 4,227,427 appears to disclose a drive unit assembly having an input pinion and a differential. A ring gear associated with the differential slings oil onto the tapered roller bearings that support the input pinion; a portion of this oil is pumped from these tapered roller bearings to the side and pinion gears of the differential.

SUMMARY

In one form, the present disclosure provides an axle assembly that includes a carrier housing, a differential housing, first and second tapered roller bearings, a gearset, a ring gear, a pinion, a third tapered roller bearing and a lubricant. The carrier housing assembly defines a cavity into which the differential housing is received. The first and second tapered roller bearings are disposed between the carrier housing and the differential housing and support the differential housing for rotation about a first axis. The gearset is received in the differential housing. The ring gear is coupled to the differential housing. The pinion is received in the cavity. The third tapered roller bearing is disposed between the carrier housing and the pinion and supports the pinion for rotation about a second axis that is perpendicular to the first axis. The lubricant is received in the cavity. The carrier housing includes a first lubricant gallery, which extends from the third tapered roller bearing to a first side of the first tapered roller bearing, and a second lubricant gallery that extends from the third tapered roller bearing to a first side of the second tapered roller bearing. The first and second tapered roller bearings are oriented to receive lubricant from the first and second lubricant galleries, respectively. The lubricant received by the first tapered roller bearing is moved through the first tapered roller bearing toward the second tapered roller bearing when the axle assembly is operated. The lubricant received by the second tapered roller bearing is moved through the second tapered roller bearing toward the first tapered roller bearing when the axle assembly is operated.

In another form, the present disclosure provides a method for lubricating differential support bearings in an axle assembly. The method includes: providing a carrier housing, a differential housing, first and second tapered roller bearings, a gearset, a ring gear, a pinion, and a third tapered roller bearing, the carrier housing assembly that defining a cavity, the differential housing being received in the cavity, the first and second tapered roller bearings being disposed between the carrier housing and the differential housing, the first and second tapered roller bearings supporting the differential housing for rotation about a first axis, the gearset being received in the differential housing, the ring gear coupled to the differential housing, the pinion received in the cavity, the third tapered roller bearing disposed between the carrier housing and the pinion and supporting the pinion for rotation about a second axis that is perpendicular to the first axis; rotating a portion of the third tapered roller bearing relative to a remaining portion to pump a lubricant through first and second lubricant galleries associated with the carrier housing to supply the lubricant to the first and second tapered roller bearings, respectively; and rotating a portion of the first and second tapered roller bearings relative to respective remaining portions to pump the lubricant through the first and second tapered roller bearings.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
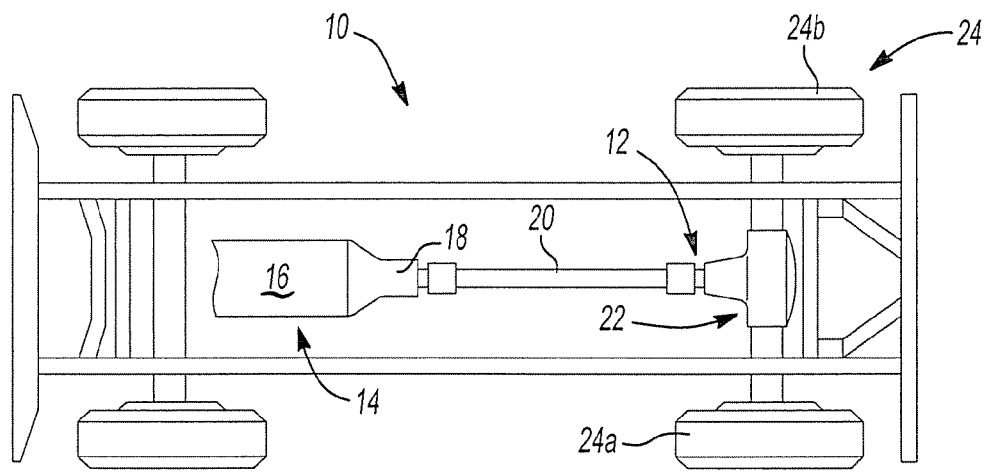
FIG. 1 is a schematic illustration of a vehicle having an axle assembly constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle assembly 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle assembly 22 where it can be selectively apportion in a predetermined manner to the left and right rear wheels 24a and 24b, respectively.

Figure 2:
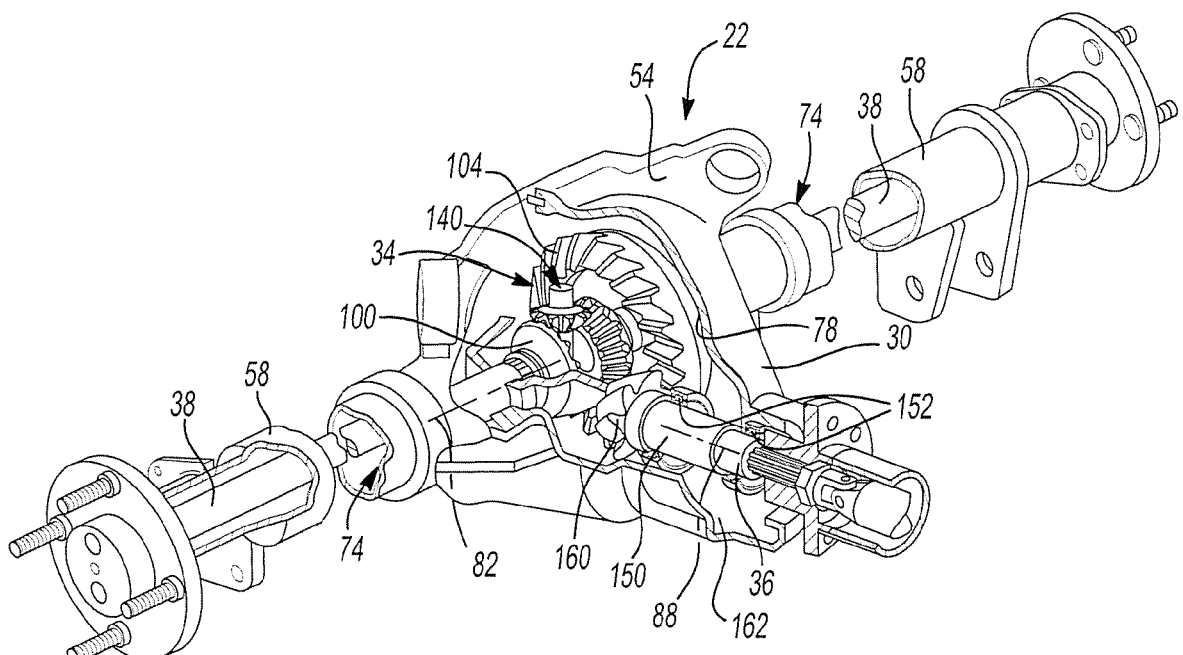
FIG. 2 is a partially broken-away perspective view of a portion of the vehicle of FIG. 1 illustrating the axle assembly in more detail.

With reference to FIG. 2, the rear axle assembly 22 can include an axle housing assembly 30, a differential assembly 34, an input pinion assembly 36 and a pair of axle shafts 38. The axle housing assembly 30 is illustrated to be a Salisbury-type axle housing assembly, but it will be appreciated that the teachings of the present disclosure have application to other types of axle housing assemblies, including independent and banjo axle housing assemblies for front and rear axle assemblies. Moreover, those of ordinary skill in the art will appreciate that the axle housing assembly 30 could be configured for a front axle or a rear axle as desired. The axle housing assembly 30 can include a carrier housing 54, a pair of bearing caps 56, a pair of axle tubes 58 and a cover 60 and can include a lubricant sump or reservoir 62 and a first oil gallery 64 and a pair of second oil galleries 66.

Figure 3:
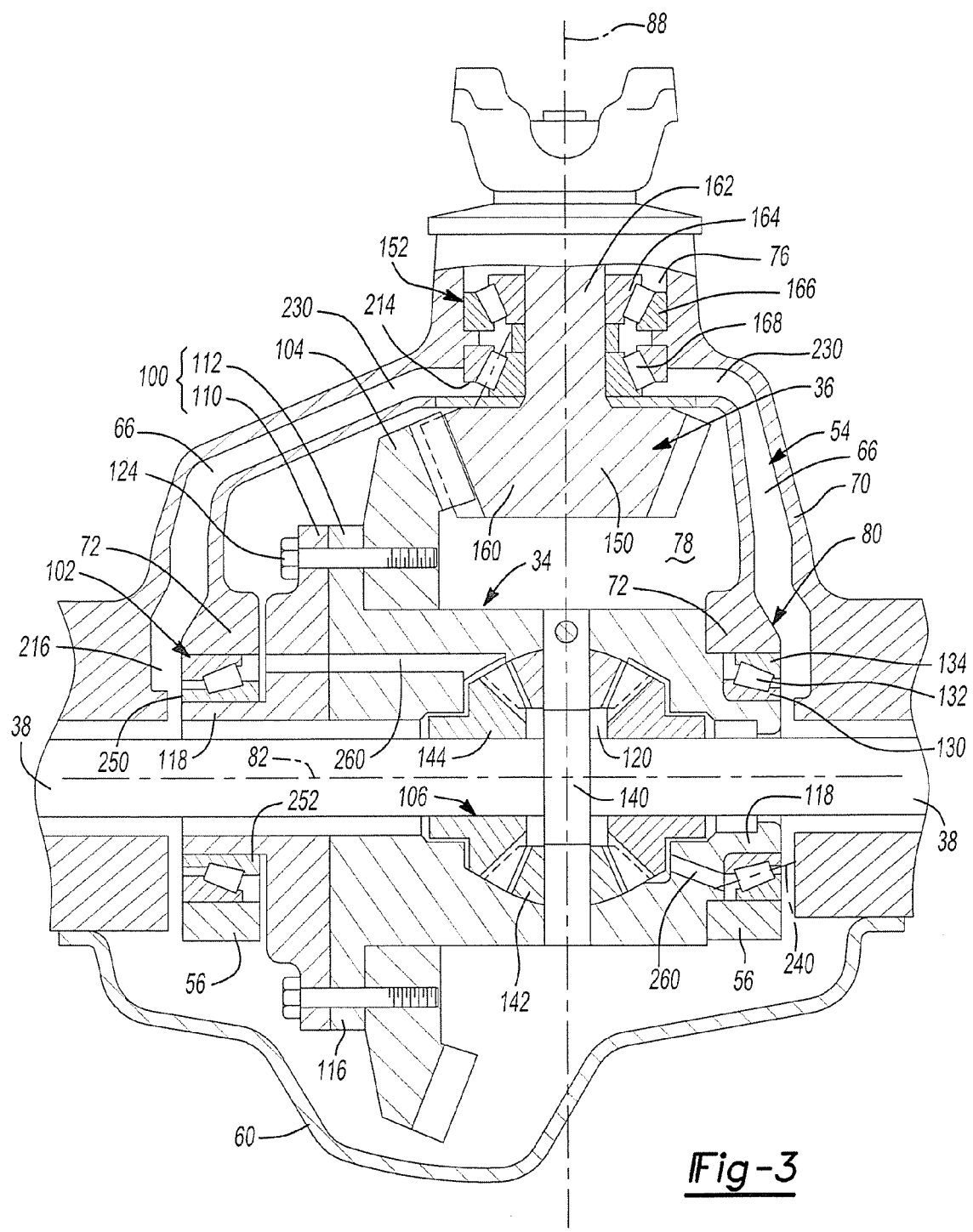
FIG. 3 is a longitudinal sectional view of a portion of the axle assembly.
Figure 4:
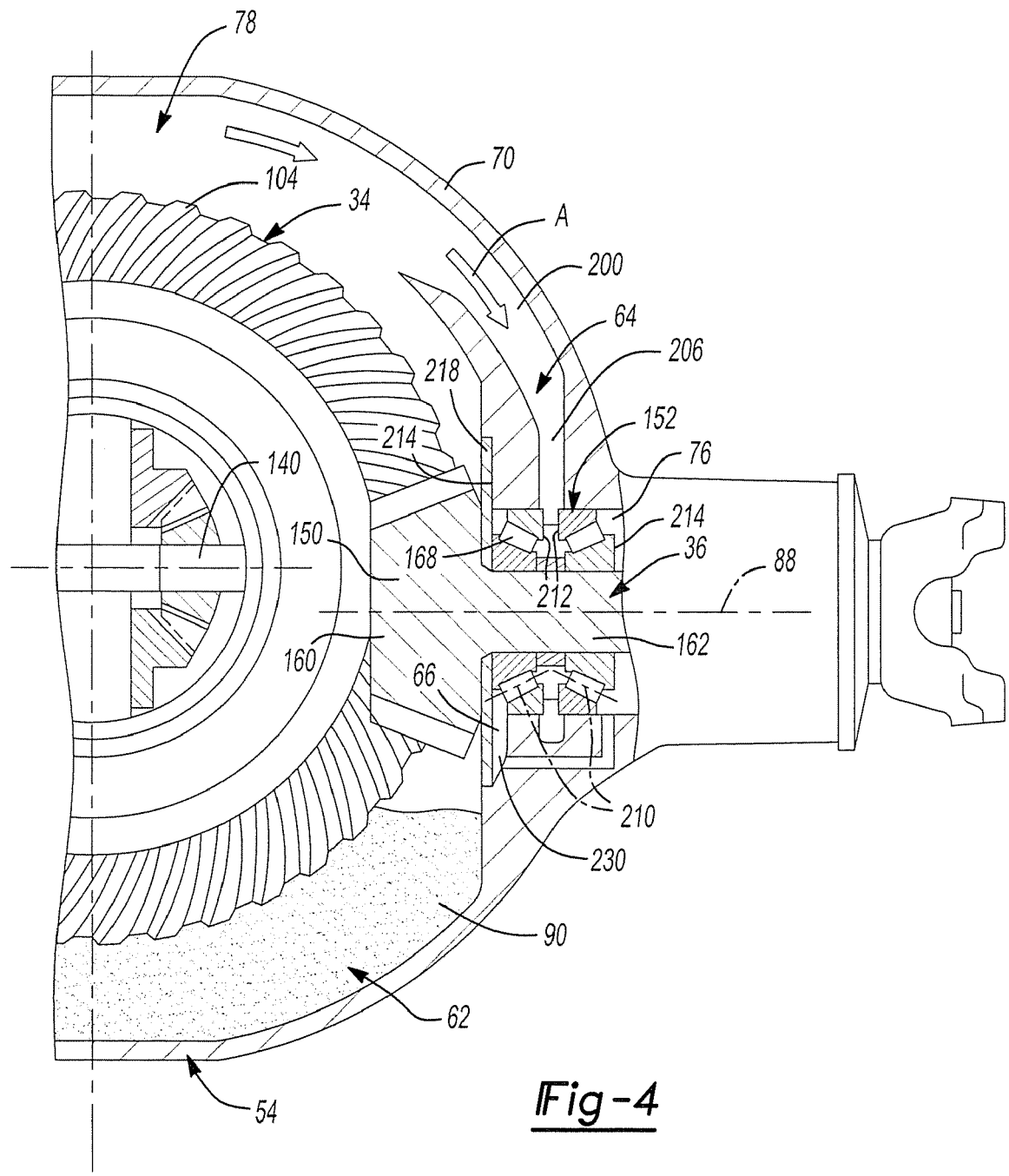
FIG. 4 is a section view taken along the line 4-4 of FIG. 3.

With additional reference to FIGS. 3 and 4, the carrier housing 54 can include a wall member 70 that can define a pair of bearing journals 72, a pair of tube bores 74, a pinion bore 76 and a differential cavity 78. Each of the bearing caps 56 can be coupled (e.g., removably coupled) to an associated one of the bearing journals 72, e.g., via a pair of threaded fasteners (not shown). The bearing caps 56 and the bearing journals 72 can cooperate to define a pair of differential bearing journals 80 on which the differential assembly 34 may be supported for rotation about a first axis 82. The tube bore 74 can be aligned to the differential bearing journals 80 and can be sized to receive the axle tubes 58 therein. The pinion bore 76 can intersect the differential cavity 78 and can extend along a second axis 88 that can be generally perpendicular to the first axis 82. The cover 60 can be removably coupled to the carrier housing 54 to close an open end of the differential cavity 78. The carrier housing 54 and the cover 60 can cooperate to define the lubricant reservoir 62, and a suitable lubricant 90 can be contained therein. The first and second oil galleries 64 and 66 can be integrally formed with or coupled to the carrier housing 54.

The differential assembly 34 can be any type of differential and can include a differential case 100, a pair of differential bearings 102, a ring gear 104 and a gear set 106. In the particular example provided, the differential case 100 includes a first case member 110 and a second case member 112, but those of ordinary skill in the art will appreciate that the differential case 100 may be unitarily formed or may be formed from several case components. The first and second case members 110 and 112 can cooperate to define a mounting flange 116, a pair of trunnions 118 and a gear cavity 120 into which the gear set 106 can be received. The ring gear 104 can be coupled to the mounting flange 116 via a plurality of threaded fasteners 124. The trunnions 118 can be hollow structures that can extend from the opposite ends of the differential case 100.

The differential bearings 102 can be any type of bearings, such as tapered roller bearings, and can include an inner bearing race 130, a plurality of rollers 132, and an outer bearing race 134. The inner bearing race 130 of each differential bearing 102 can be coupled (e.g., press-fit) to a corresponding one of the trunnions 118. The outer bearing race 134 of each differential bearing 102 can be received in a corresponding one of the differential bearing journals 80 (i.e., between a bearing cap 56 and an associated one of the bearing journals 72). In the example provided, the bearing cap 56 can apply a clamping force to the outer bearing race 134 that clamps the outer bearing race 134 to the differential bearing journal 80.

The gear set 106 can include a pinion shaft 140, which can extend through the differential case 100 generally perpendicular to the first axis 82, a pair of pinion gears 142, which can be rotatably mounted on the pinion shaft 140, and a pair of side gears 144 that can be in meshing engagement with the pinion gears 142. The side gears 144 can include an inner diameter having a plurality of spline teeth (not specifically shown) formed thereon.

The input pinion assembly 36 can be received in the pinion bore 76 in the carrier housing 54 and can include an input pinion 150 and a pair of pinion bearings 152. The input pinion 150 can include a pinion portion 160, which can be meshingly engaged to the ring gear 104, and a shaft portion 162. The pinion bearings 152 can be tapered roller bearings or angular contact ball bearings having an inner bearing race 164, an outer bearing race 166 and a plurality of rollers 168 disposed between the inner and outer bearing races 164 and 166. The pinion bearings 152 can be mounted on the shaft portion 162 and coupled to the carrier housing 54 to support the input pinion 150 for rotation about a second axis 88 that can be perpendicular to the first axis 82.

The axle shafts 38 can be received through the axle tubes 58 and can be coupled for rotation with the side gears 144 (e.g., via mating sets of spline teeth (not specifically shown) formed on the inside diameter of the side gears 144 and the outer diameter of a portion of the axle shafts 38.

During operation of the vehicle 10 (FIG. 1) in a predetermined (e.g., forward) direction, rotary power is transmitted from the input pinion assembly 36 to the differential assembly 34 to cause the differential case 100 to rotate. More specifically, the teeth T of the input pinion 150 transmit rotary power to the ring gear 104, causing the ring gear 104 (and the differential case 100) to rotate about the second axis 88. As the ring gear 104 rotates, a radially outward portion of it passes through the lubricant 90 in the lubricant reservoir 62 and clings to the ring gear 104. Due to centrifugal force, a portion of the lubricant that has clung to the ring gear 104 will be slung from the ring gear 104.

With specific reference to FIG. 4, the first oil gallery 64 can include a first, open end 200 that can be shaped and positioned so as to collect lubricant 90 that has been slung from the ring gear 104. For example, the first open end 200 can have a frusto-conical shape that facilitates collection of slung lubricant 90. The collected lubricant may be slung directly into the open end 200 of the first oil gallery 64 as depicted by the arrows A, and/or could initially collect on the wall member 70 of the carrier housing 54 and drain into the open end 200. A second, opposite end 206 of the first oil gallery 64 can terminate adjacent the pinion bearings 152. Each of the pinion bearings 152, which can be a tapered roller bearing, can include a plurality of rollers 168 whose axes 210 can diverge outwardly from the second axis 88 with increasing distance from the other one of the pinion bearings 152. The lubricant 90 directed to a first side 212 of the pinion bearings 152 can be received between the rollers 168 and due to centrifugal force, can be directed out of a second, opposite side 214 of the pinion bearings 152. It will be appreciated that structures, such as seals or baffles, can be employed inhibit or limit the flow of lubricant 90 exiting the second side 214 of the pinion bearings 152 in a desired manner. In the particular example provided, a generally flat plate structure 218 is fitted about the pinion shaft 140 and received in the carrier housing 54 to urge the lubricant 90 that exits the second side 214 of the pinion bearings 152 to be received into a first end 230 of the second oil galleries 66.

With specific reference to FIG. 3, each of the second oil galleries 66 can extend from the first end 230, which is proximate the second side 214 of the pinion bearings 152, to a second end 216 that can be proximate an associated one of the differential bearings 102. The rollers 132 of the differential bearings 102 can be arranged such that their axes 240 diverge from the first axis 82 with decreasing distance toward an opposite one of the differential bearings 102. Accordingly, lubricant 90 discharged from the second oil galleries 66 proximate a first side 250 of the differential bearings 102 can be received between the rollers 132 and discharged from a second side 252 of the differential bearings 102. It will be appreciated that some portion of the lubricant 90 discharged from the second side 252 of the differential bearings 102 can be received through one or more apertures 260 in the differential case 100 that can permit lubricant 90 to be received into the gear cavity 120 to facilitate lubrication of the gear set 106.

It will be appreciated that third oil galleries (not specifically shown) could be coupled in fluid communication to the first oil gallery 64 and/or second oil gallery 66 to distribute a portion of the lubricant 90 received into the first oil gallery 64 into openings (not specifically shown) in the carrier housing 54 so that such lubricant 90 can be received into the axle tubes 58. The lubricant 90 that is received into the axle tubes 58 can be employed to lubricate wheel bearings and seals, as well as to reject heat to the axle tubes to thereby aid in the cooling of the lubricant 90.

Figure 3A:
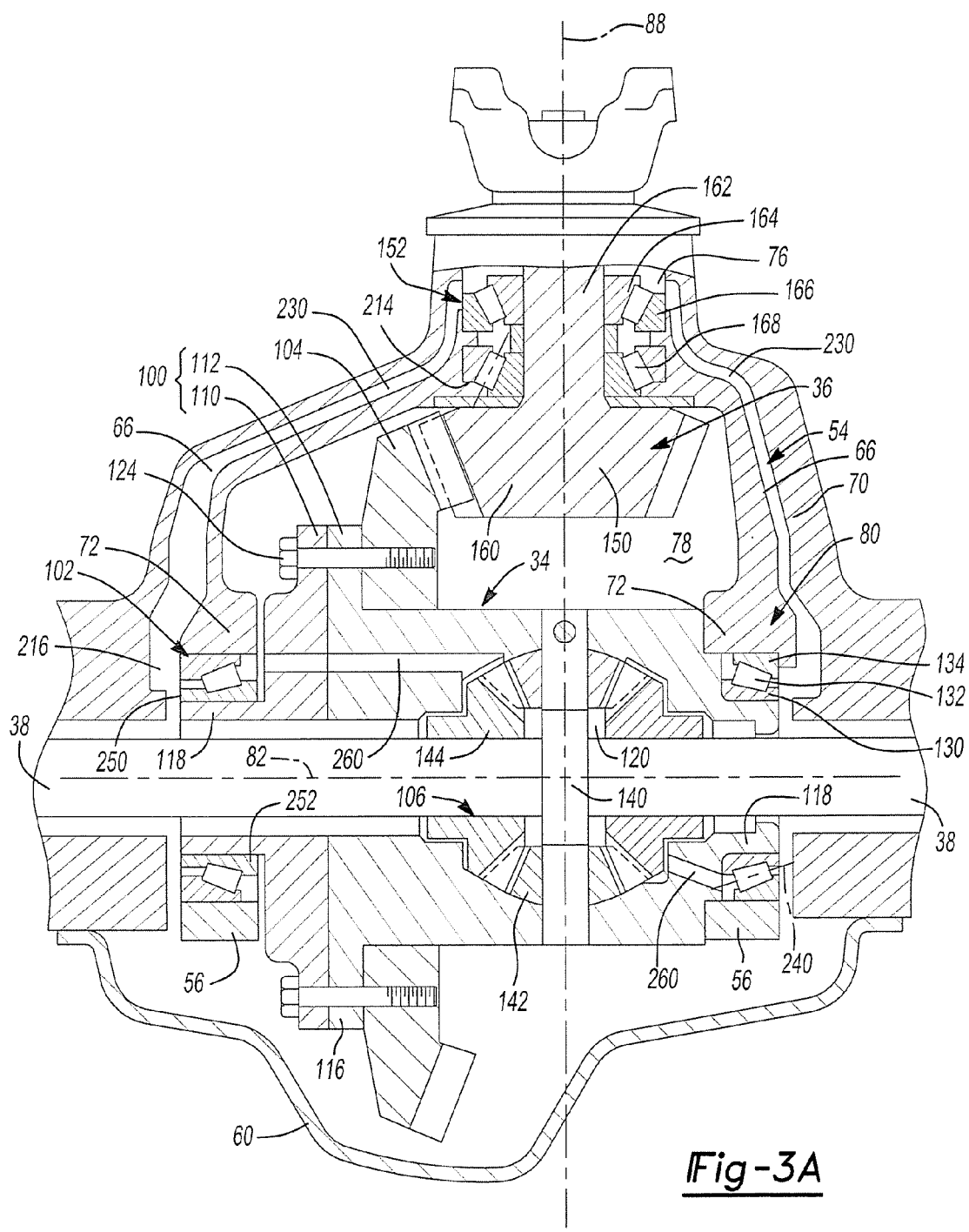
FIG. 3A is a view similar to that of FIG. 3, but illustrating the second oil galleries as being fed lubricant from the pinion bearing that is furthest from the teeth of the pinion.
Figure 3B:
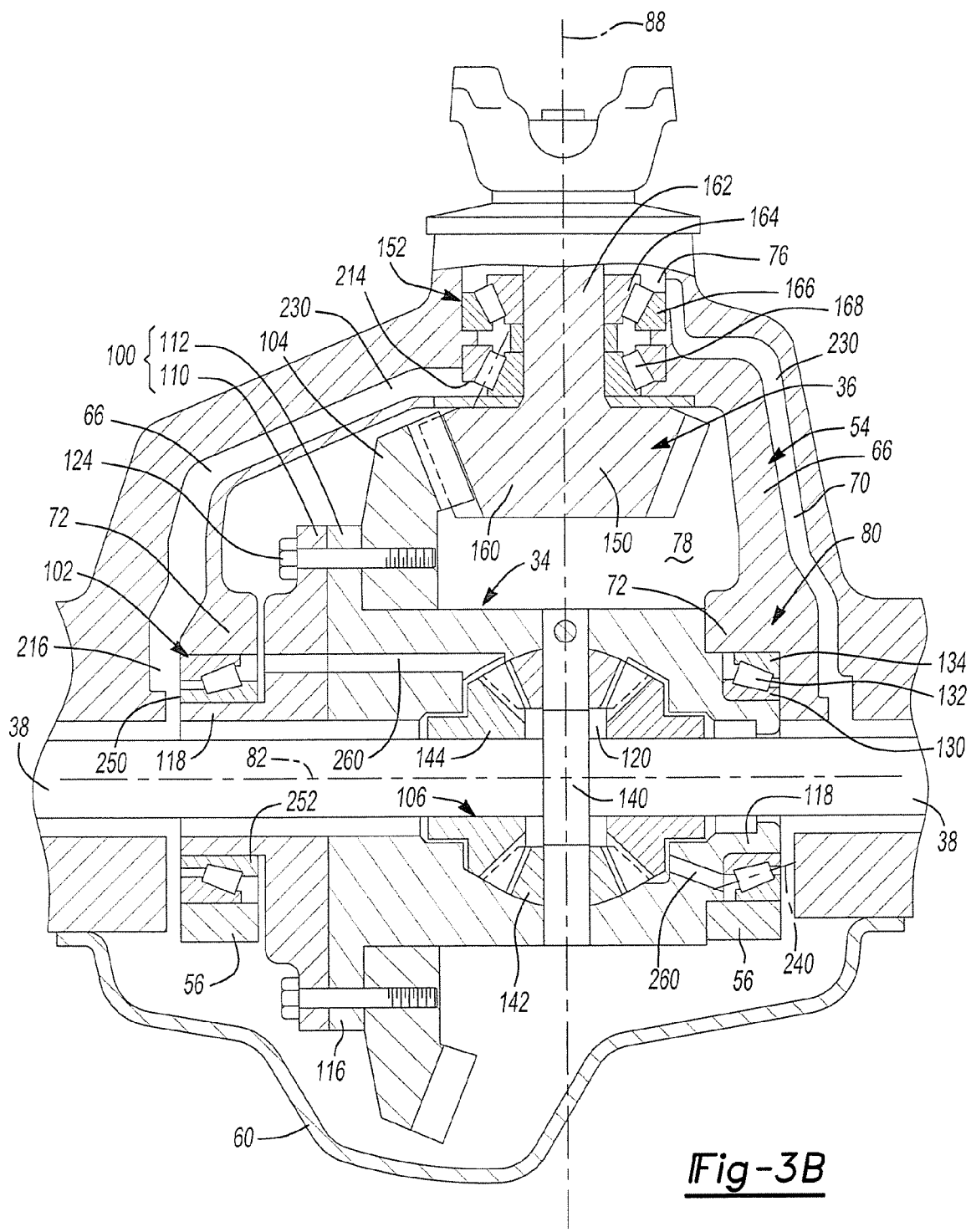
FIG. 3B is a view similar to that of FIG. 3, but illustrating each of the second oil galleries as being fed from a different one of the pinion bearings.

While the second oil galleries 66 have been illustrated as being fed lubricant from the one of the pinion bearings 152 that is closest to the teeth T of the input pinion 150 (i.e., the head bearing), it will be appreciated that the second oil galleries 66 could be fed lubricant from the other one of the pinion bearings 152 (i.e., the tail bearing, which is axially further from the teeth T of the input pinion 150) as shown in FIG. 3A. It will also be appreciated that a first one of the second oil galleries 66 could be fed from a first one of the pinion bearings 152 and the other one of the second oil galleries 66 could be fed from a second, different one of the pinion bearings 152 as shown in FIG. 3B.

Figure 5:
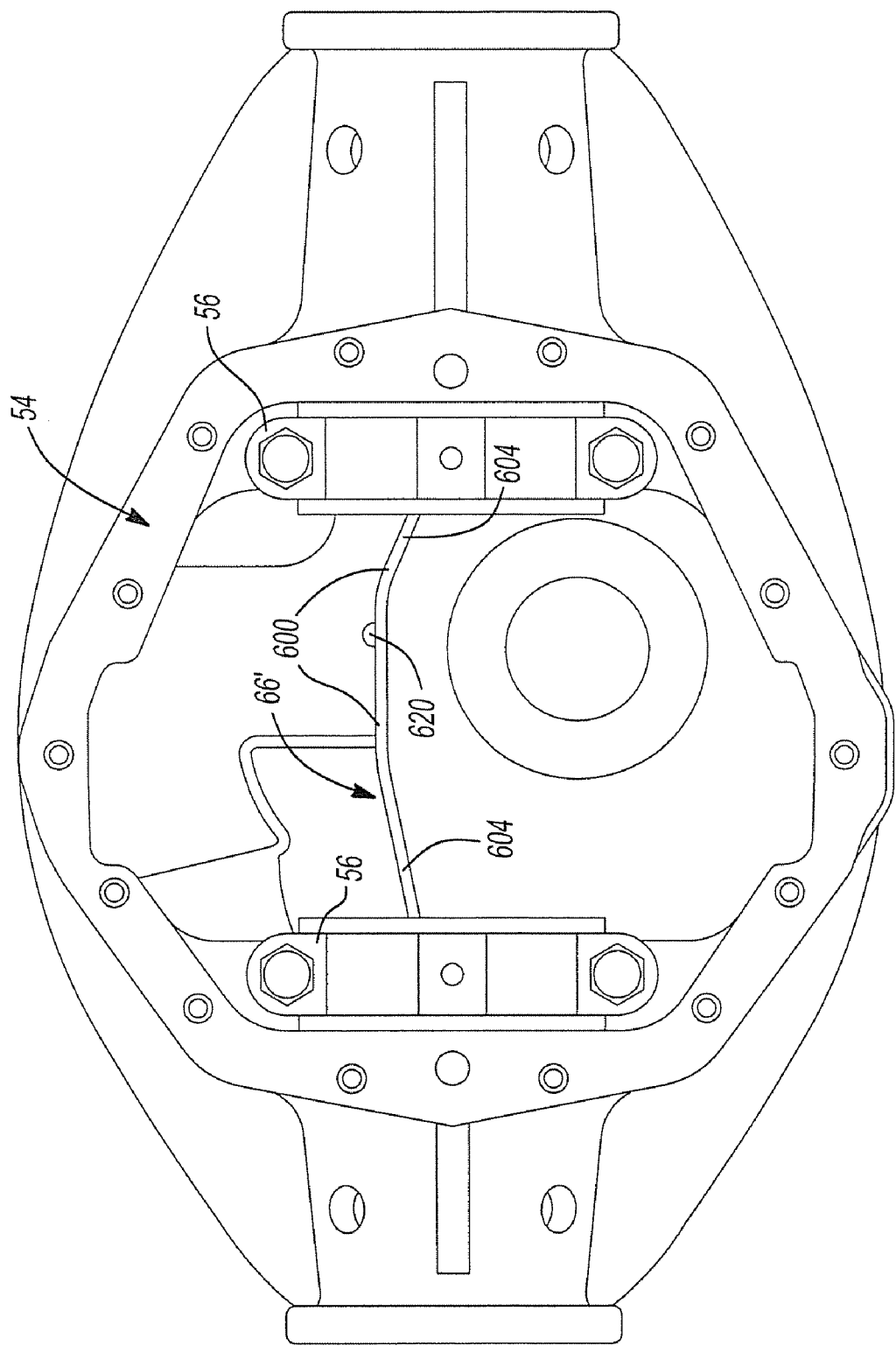
FIG. 5 is a rear elevation view of a portion of another axle assembly constructed in accordance with the teachings of the present disclosure.
Figure 6:
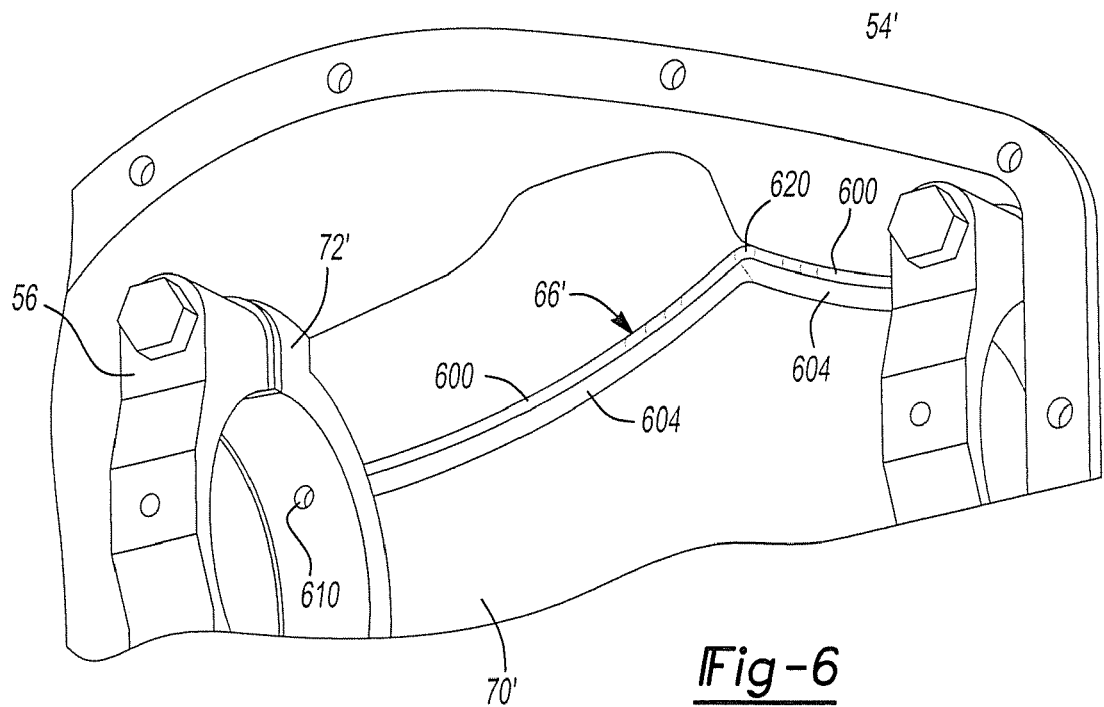
FIG. 6 is a perspective view of the axle assembly of FIG. 5, illustrating the second oil galleries in more detail.
Figure 7:
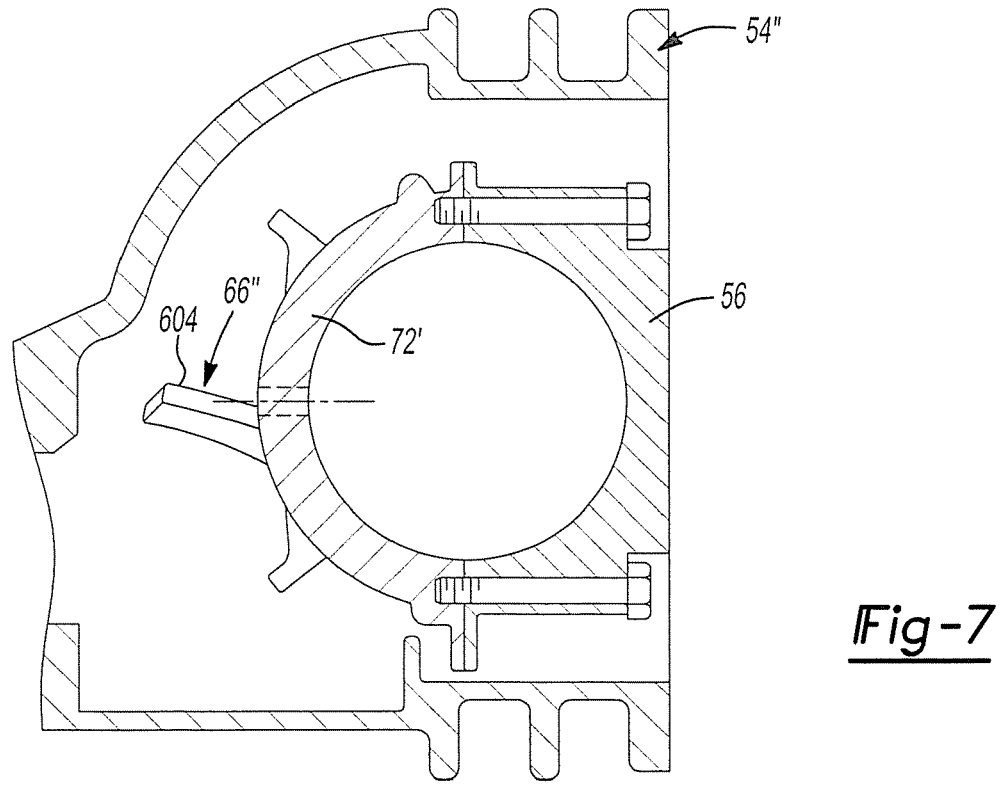
FIG. 7 is a section view of a portion of another axle assembly constructed in accordance with the teachings of the present disclosure, the section being taken through the carrier housing through the rotational axis of the input pinion assembly and perpendicular to a rotational axis of the differential assembly.
Figure 8:
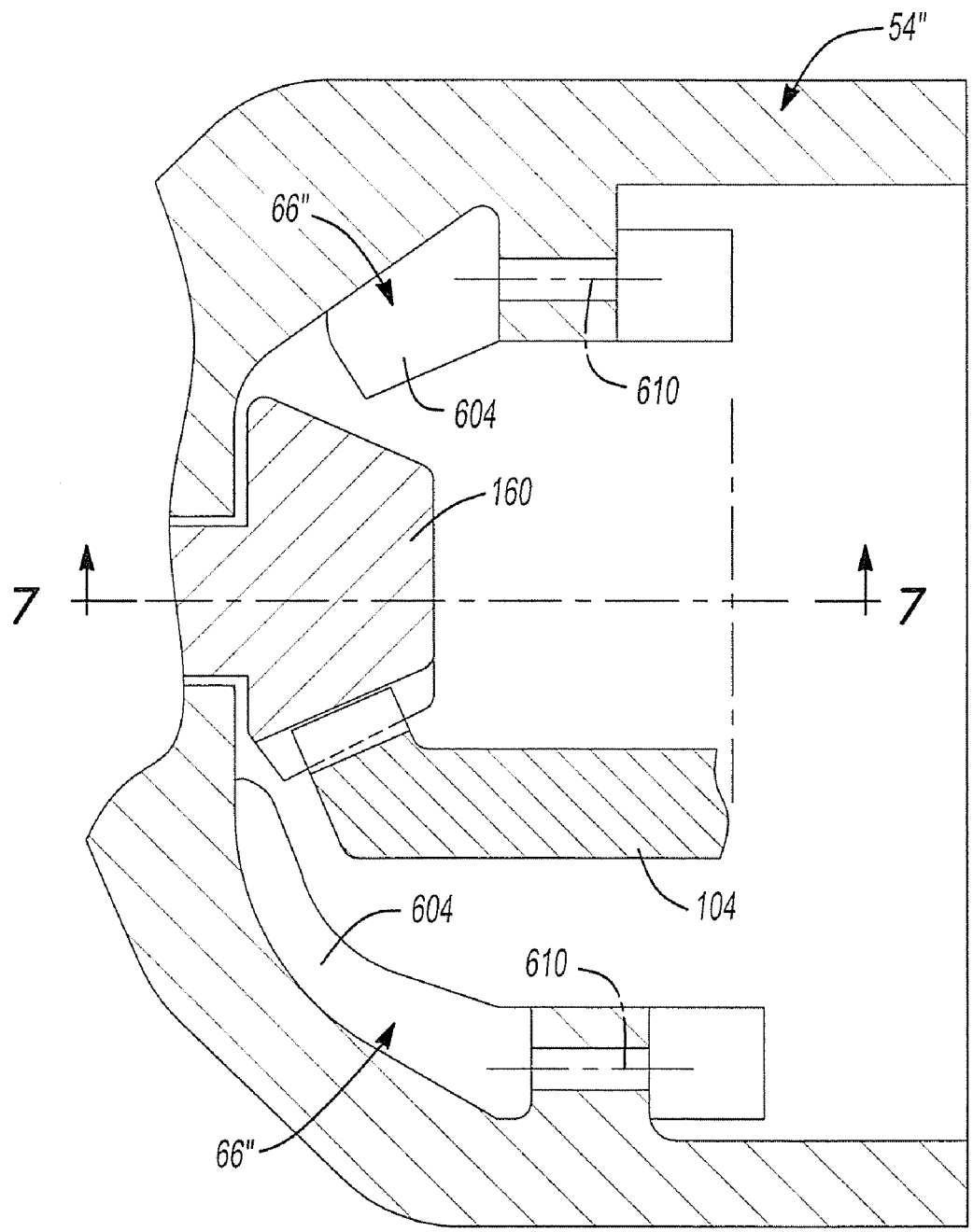
FIG. 8 is a section view of a portion of the axle assembly of FIG. 7 taken parallel to the rotational axis of the input pinion assembly and the rotational axis of the differential assembly.

While the axle assembly 22 has been illustrated and described as including a carrier housing 54 having enclosed conduits (i.e., the second oil galleries 66') that are integrally formed therewith (e.g., formed with the carrier housing 54 when the carrier housing 54 is cast), those of ordinary skill in the art will appreciate that an axle assembly constructed in accordance with the teachings of the present disclosure may be formed somewhat differently. For example, the conduits (i.e., the second oil galleries 66') can be formed separately from the carrier housing 54 and can be assembled thereto. As another example, the second oil galleries 66' may include one or more open channels 600 as illustrated in FIGS. 5 and 6. In the example illustrated, the carrier housing 54' is constructed such that the wall member 70' includes one or more interior walls or rails 604 that slope toward the bearing journals 72'. The rails 604 can have an exterior surface with any desired shape, such as an arcuate channel shape into which lubricant can collect. A feed aperture 610 can be formed through each of the bearing journals 72' to permit lubricant to flow from an associated one of the rails 604 to the differential bearings (not specifically shown). The lubricant can be directed to the rails 604 in several ways. For example, the second oil galleries 66' can include a conduit portion 620 that can be integrally formed with the carrier housing 54'. The conduit portion 620 can receive lubricant from the second side of the differential bearings as described above and can discharge the lubricant to one or more of the rails 604. Additionally or alternatively, splash lubrication can be employed to deposit lubricant on the rails 604. Such splash lubrication could employ lubrication slung from the ring gear 104 and/or lubricant exiting the second side of the pinion bearings (as described above) that is received onto (and slung from) the pinion portion 150 as illustrated in FIGS. 7 and 8. In this example, oil slung from the ring gear 104 and the pinion portion 160 is deposited directly onto the rails 604 of the second oil galleries 66", which are integrally formed with the carrier housing 54".

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly comprising:
a carrier housing assembly that defines a cavity;
a differential housing received in the cavity;
first and second bearings disposed between the carrier housing and the differential housing, the first and second bearings being tapered roller bearings and supporting the differential housing for rotation about a first axis;
a gearset received in the differential housing;
a ring gear coupled to the differential housing;
a pinion received in the cavity, the pinion having a plurality of teeth that are meshingly engaged to the ring gear;
a third bearing disposed between the carrier housing and the pinion, the third bearing supporting the pinion for rotation about a second axis that is perpendicular to the first axis; and
a lubricant received in the cavity;
wherein the carrier housing includes a first lubricant gallery, which extends from the third bearing to a first side of the first bearing, and a second lubricant gallery that extends from the third bearing to a first side of the second bearing, the first and second bearings being oriented to receive lubricant from the first and second lubricant galleries, respectively;
wherein the lubricant received by the first bearing is moved through the first bearing toward the second bearing when the axle assembly is operated; and
wherein the lubricant received by the second bearing is moved through the second bearing toward the first bearing when the axle assembly is operated.

2. The axle assembly of claim 1, wherein the differential housing includes first and second openings that are configured to receive at least a portion of the lubricant that is discharged from a second side of each of the first and second bearings.

3. The axle assembly of claim 1, wherein the first lubricant gallery is integrally formed with the carrier housing.

4. The axle assembly of claim 3, wherein the second lubricant gallery is integrally formed with the carrier housing.

5. The axle assembly of claim 4, further comprising a fourth bearing disposed between the carrier housing and the pinion, the fourth bearing supporting the pinion for rotation about the second axis, the fourth bearing being disposed closer to the teeth of the pinion than the third bearing.

6. The axle assembly of claim 1, further comprising a fourth bearing disposed between the carrier housing and the pinion, the fourth bearing supporting the pinion for rotation about the second axis, the fourth bearing being disposed axially further from the teeth of the pinion than the third bearing.

7. The axle assembly of claim 1, wherein the third bearing is a tapered roller bearing or an angular contact ball bearing.

8. An axle assembly comprising:
a carrier housing assembly that defines a cavity;
a differential housing received in the cavity;
first and second bearings disposed between the carrier housing and the differential housing, the first and second bearings being tapered roller bearing and supporting the differential housing for rotation about a first axis;
a gearset received in the differential housing;
a ring gear coupled to the differential housing;
a pinion received in the cavity, the pinion having a plurality of teeth that are meshingly engaged to the ring gear;
a third bearing disposed between the carrier housing and the pinion, the third bearing supporting the pinion for rotation about a second axis that is perpendicular to the first axis;
a fourth bearing disposed between the carrier housing and the pinion, the fourth bearing supporting the pinion for rotation about the second axis, the fourth bearing being disposed closer to the teeth of the pinion than the third bearing; and
a lubricant received in the cavity;
wherein the carrier housing includes a first lubricant gallery, which extends from one of the third bearing and the fourth bearing to a first side of the first bearing, and a second lubricant gallery that extends from one of the third bearing and the fourth bearing to a first side of the second bearing, the first and second bearings being oriented to receive lubricant from the first and second lubricant galleries, respectively;
wherein the lubricant received by the first bearing is moved through the first bearing toward the second bearing when the axle assembly is operated; and
wherein the lubricant received by the second bearing is moved through the second bearing toward the first bearing when the axle assembly is operated.

9. The axle assembly of claim 8, wherein both the first and second lubricant galleries are fed lubricant directly from the third bearing.

10. The axle assembly of claim 8, wherein both the first and second lubricant galleries are fed lubricant directly from the fourth bearing.

11. The axle assembly of claim 8, wherein the first and second lubricant galleries are fed lubricant directly from different ones of the third and fourth bearings.

12. The axle assembly of claim 8, wherein the third bearing is a tapered roller bearing or an angular contact ball bearing.

* * * * *